V = Forward
R = Rearward

Nov. 2, 1965  R. K. A. SCHENCK ETAL  3,214,987
GEAR SHIFT AND TRANSMISSION FOR INDUSTRIAL TRUCKS
Filed Dec. 10, 1962  5 Sheets-Sheet 2
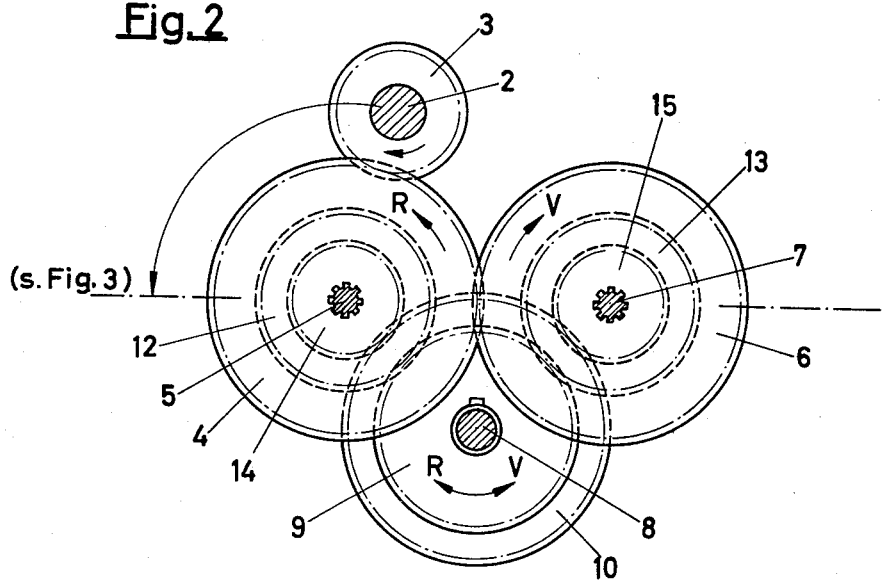
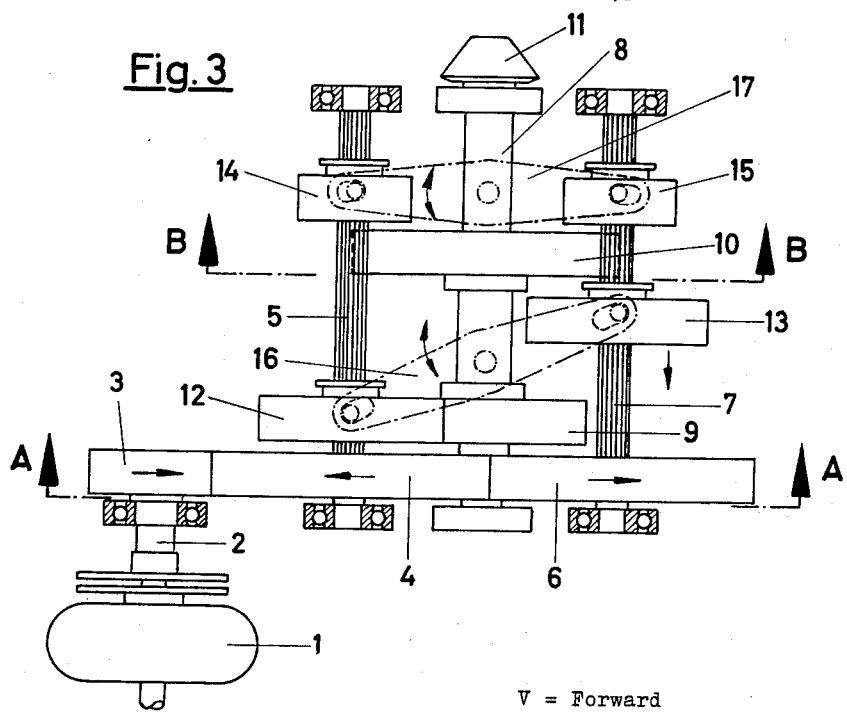
V = Forward
R = Rearward

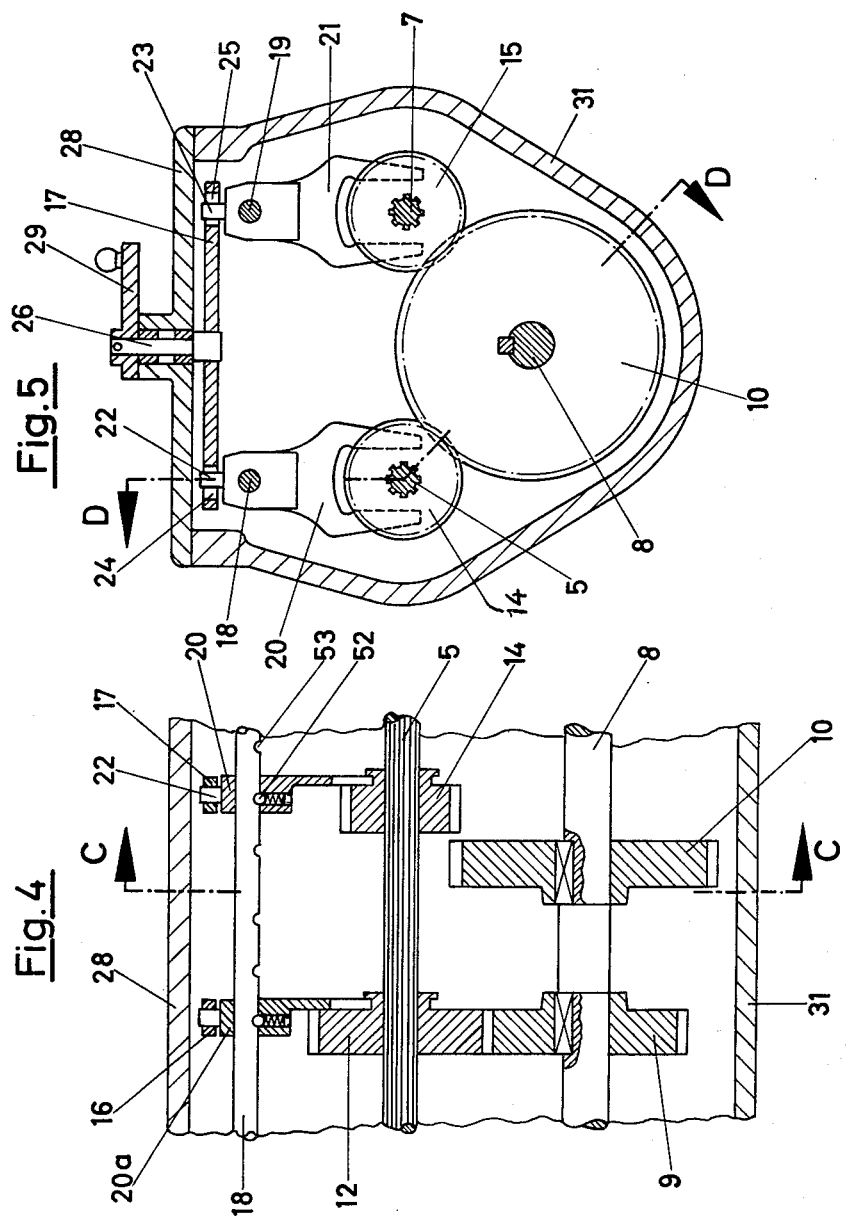

3,214,987
GEAR SHIFT AND TRANSMISSION FOR
INDUSTRIAL TRUCKS
Robert Karl August Schenck and Werner Thum, Velbert,
Rhineland, Germany, assignors to Yale & Towne
G.m.b.H., Velbert, Rhineland, Germany, a corporation
of Germany
Filed Dec. 10, 1962, Ser. No. 243,978
Claims priority, application Germany, Feb. 28, 1962,
Y 565
3 Claims. (Cl. 74—331)

This invention relates to a gear shift and transmission for vehicles which frequently change their direction of drive because of working requirements, such as earth movers and especially lift trucks.

The transmission and gear shift mechanisms that are generally used are not practicable in vehicles of the particular kind, because the usual transmission has two forward speed positions that are effected by movement of the shift handle in one plane, the two rearward speed positions being effected by movement of a handle in a parallel plane. It is necessary to reverse the direction of drive at very short intervals, and to do that with the usual shifting arrangement, the driver must repeatedly move the shift handle in an angular direction, making it extremely difficult to maneuver a lift truck. Transmissions have been developed which will allow the driver to move the shift handle merely in one direction to effect forward drive and in the opposed direction to effect rearward drive. Such a transmission is shown, for example, in the German Patent No. 1,080,282. That transmission facilitates shifting to a considerable extent, but is very complicated and difficult to manufacture. Through the novel concept of our invention, we contribute a very ingenious transmission that allows shifting in the manner that is desired, but that is much simpler than the earlier arrangements that have been developed for the purpose.

In our invention, we utilize two intermediate forward and rearward shafts having two pairs of splined gears adapted to mesh with speed gears, the gears of each pair being so connected as to shift in opposed axial directions relatively to each other on their shafts.

We particularly arrange each of the shiftable gears so as to shift in the same direction when moving into meshing engagement with its particular speed gear. Then, by utilizing a simple lever connecting the two gears of each pair, any one of the shiftable gears may be placed in meshing position, and it will be a very simple matter to utilize a shift lever that always will move in the same direction to effect a corresponding direction of drive, regardless of the speed selected by the driver. Then, the shift lever need not be moved in an angular direction to reverse the drive, the angular movement being used only for shifting speed.

Furthermore, the invention can easily be applied to a sliding type coupler sleeve transmission or fully-synchronized transmissions, having one drive shaft, one forward and one rearward intermediate shaft and one driven shaft, and wherein one gear wheel of each intermediate shaft is constantly in engagement with one gear wheel of the driven shaft, and wherein the gear wheels on the intermediate shafts are freely rotatable but not moveable lengthwise on their shafts, and wherein, by means of a shifting mechanism and splined sliding type coupler sleeves or synchronizing units, the gear wheels can be coupled to their intermediate shafts or uncoupled from said shafts.

Referring to the attached drawings of the invention:

FIG. 2 is a cross-section on the lines A—A in FIG. 3.

FIG. 3 is a schematic plan view of the transmission.

FIG. 4 is a cross-section on the lines D—D in FIG. 5.

FIG. 5 is a cross-section on the lines C—C in FIG. 4 or on the lines B—B in FIG. 3.

Figure 1A:
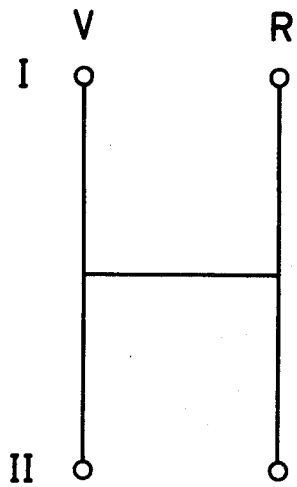
FIG. 1a is a gear shifting diagram for a conventional transmission.
Figure 1:
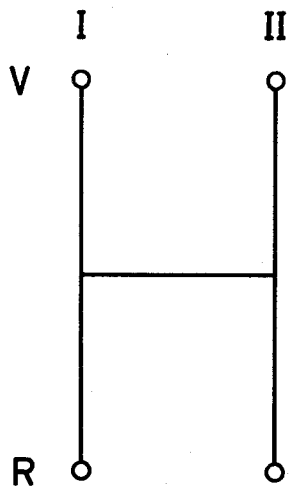
FIG. 1b is the gear shifting diagram for the new transmission.
Figure 7:
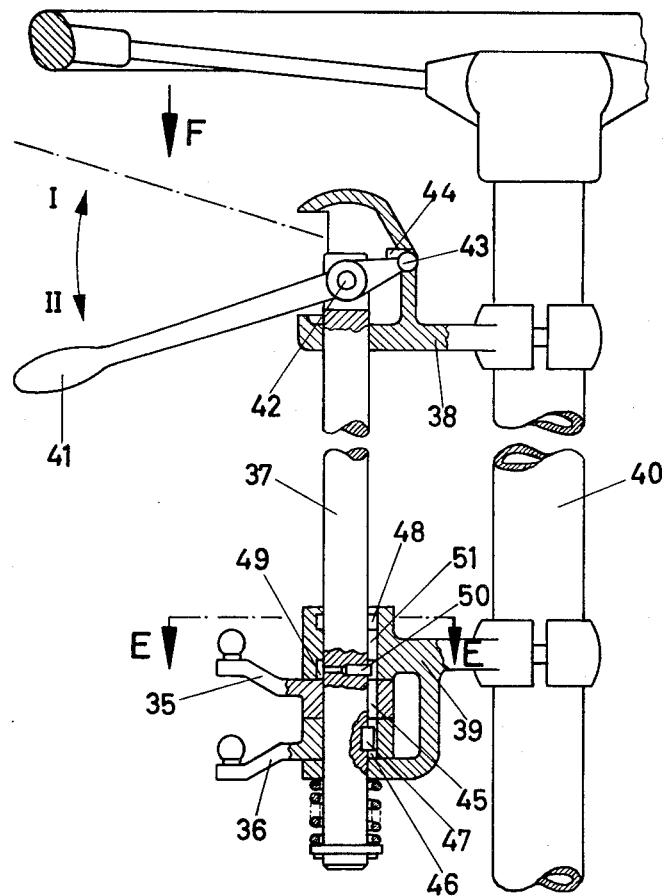
FIG. 7 shows the mounting of the gear shift handle and that part of the linkage which mounted to the steering column.
Figure 8:
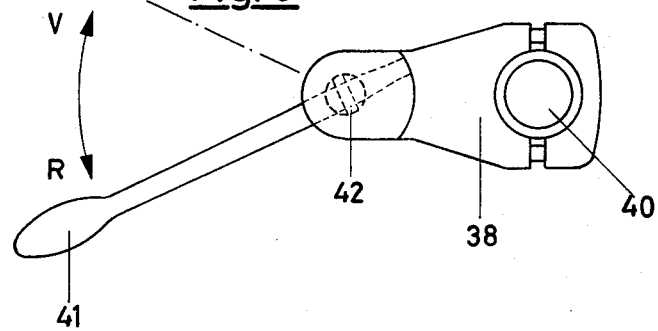
FIG. 8 is a view of the gear shift handle as seen from F in FIG. 7.

The gear shifting diagram according to FIG. 1a is of a hitherto most common kind, wherein the positions of the shift handle for the two forward speeds are in one plane and the positions for the two rearward speeds are in a thereto parallel plane. In order to be able to shift from forward to reverse according to this shifting arrangement, it is always necessary to shift twice around a corner, a movement that is very disturbing when it is required to change the driving direction of a vehicle quickly and repeatedly.

A shifting diagram according to FIG. 1b, which is much more favorable for use on an industrial truck, and which is made possible by the design of a transmission according to this invention, enables the driver to shift, when in a chosen speed position, very easily from forward to reverse and vice versa simply by plane to and fro motion of the shift handle without having to move the handle around a corner. A vehicle furnished with a transmission that makes shifting this way possible is preferably provided with a fluid flywheel clutch that enables the driver to start at a fairly high speed or to quickly change driving directions in accordance with this invention without stalling the engine.

The essential design features of a transmission according to this invention, which permits shifting according to FIG. 1b, can best be seen in FIG. 3.

The drive shaft 2, which is connected to a fluid flywheel clutch 1, is provided at its other end with a gear wheel 3, which is rigidly secured and keyed to said drive shaft and which constantly engages another gear wheel 4 rigidly secured and keyed to a rearward intermediate shaft 5.

Said gear wheel 4 constantly engages a gear wheel 6 of the same size which is fixed to a forward intermediate shaft 7. On the driven shaft 8 which is located centrally below the two intermediate shafts 5 and 7, two gear wheels 9 and 10 of different sizes are rigidly secured and keyed. The driven shaft 8 is provided at one end with a bevel gear 11, which is connected to the driving axle of the vehicle. Both ends of the shafts are supported by unspecified ball bearings. To that extent the new transmission is equivalent to conventional transmissions.

In the new design according to this invention, the sliding gear wheels on the intermediate shafts 5 or 7 no longer form a unit which, by means of a shift fork can be moved on its shaft into and out of engagement with the gear wheels mounted on the driven shaft.

In this invention, the sliding gear wheels on the intermediate shafts which are associated with one gear wheel on the driven shaft, are connected in such a way, that they will move in opposed directions. The sliding gear wheel 12 on the rearward intermediate shaft 5 is connected to sliding gear wheel 13 on the forward intermediate shaft 7 by means of a shifting double-lever 16, which, as can best be seen in FIG. 5, is rotatably and centrally mounted in the transmission case 31. The sliding gear wheel 14 on the rearward intermediate shaft 5 is connected to sliding gear wheel 15 on the forward intermediate shaft 7 by means of a shifting double-lever 17, which is mounted the same way as double-lever 16. The intermediate shafts 5 and 7 as well as the center bores of the sliding gear wheels 12, 13, 14 and 15 are splined in a customary way to allow only relative lengthwise motion of the gear wheels.

As shown in FIGS. 4 and 5, the shifting double-levers 16 and 17 are not directly connected to their sliding gear wheels, but are connected to conventional shift forks, of which shift forks 20 and 21 are shown in FIG. 5.

These shift forks engage with their lower portions grooves of the sliding gear wheels, while their upper portions, which are slidingly mounted on guide rods 18 and 19, are provided with pivots, e.g. 22 or 23, which engage elongated holes in the end portions of the shifting double-lever 17. The double-levers 16 and 17 are rigidly secured and keyed to shafts 26 and 27. Said shafts stick out of the transmission case cover 28 and are provided at their protruding ends with one-arm levers 29, 30, which are also fixed to said shafts.

It will be recognized that shifting from forward to reverse in each speed can easily be achieved by plane motion of the shift handle. The push rods 33, 34, will, when moved lengthwise, move their associated shift forks and sliding gear wheels by way of the spherical extensions on the one-arm levers 29, 30, the shafts 26, 27 and the shifting double-levers 16, 17.

Figure 6:
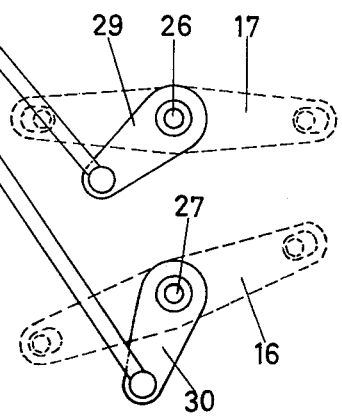
FIG. 6 is a view illustrating part of the linkage through which the gear shift handle actuates the gear shift including a cross-section on the lines E—E in FIG. 7.

If we assume that the push rod 34 is moved to the right as shown in FIG. 6, the sliding gear wheel 12 on the rearward intermediate shaft 5 will engage gear wheel 9 of the driven shaft 8, as is shown in FIGS. 3 and 4, and sliding gear wheel 13 on the forward intermediate shaft 7, which is connected to sliding gear wheel 12 on the rearward intermediate shaft 5 by means of shifting double-lever 16, will be moved away from gear wheel 9 of the driven shaft 8. When the direction of movement of the push rod 34 is reversed, the sliding gear wheel 12 will be disengaged from gear wheel 9 of the driven shaft 8, while sliding gear wheel 13 will engage said gear wheel 9.

In order to obtain lengthwise movement of the push rods 33 and 34, which are linked to the one-arm levers 29 and 30, for the purpose of achieving shifting of the sliding gear wheels, said push rods 33 and 34 are linked with their other ends to one-arm levers 35 and 36. Said one-arm levers surround the mainly vertical shift rod 37 ring-like at its lower end. The shift rod 37 is supported by an upper bearing bracket 38 and a lower bearing bracket 39, both of which are fixed to the steering column 40. The upper bearing bracket 38 is mouth-shaped at its shift rod receiving end, thereby guaranteeing enough clearance for moving the shift handle 41, which is linked to the upper end of shift rod 37 by way of a pivot 42, horizontally and vertically.

The shift handle 41 is provided with a ball-tipped extension which reaches beyond the pivot 42 and which fits into a horizontal groove 44 of the bearing bracket 38.

It will be recognized that according to this arrangement, a vertical movement of the shift handle will result in a lifting or lowering of the shift rod 37 relative to its bearing brackets 38 and 39, whereas a movement of the shift handle in a horizontal plane effects turning of the shift rod 37 around its longitudinal axis.

The lower bearing bracket 39, which is shaped like a fork, receives shift rod 37 and between its upper and lower portion the shift rod ring-like surrounding one-arm levers 35 and 36.

These one-arm levers 35 and 36 are provided with grooves 45, 46, which run parallel to the longitudinal axis of the shift rod 37. A key 47, which is fixed to said shift rod, will engage one of the grooves, depending on the position of the shift rod 37.

In the upper part of bearing bracket 39 are two grooves 48 and 49 which encircle shift rod 37. A key 50 that is fixed to shift rod 37 will travel in one of the grooves together with one of the one-arm levers 35 or 36 when the shift rod is turned. A connection groove 51, which runs parallel to the longitudinal axis of the shift rod, is provided between the circular grooves 48 and 49 in order to allow key 50 to travel from one of the circular grooves 48 or 49 to the other.

After a speed has been chosen and the shift handle 41 vertically moved to facilitate a horizontal movement for the shifting to forward or reverse in that speed, key 50 and the circular grooves 48 and 49 serve the purpose of keeping the shift rod 37 engaged with one of the one-arm levers 35 or 36 by way of its key 47 and the slots 45 or 46.

In order to keep the shift forks, which shift the sliding gear wheels on the intermediate shafts, in their neutral or engagement positions, they are provided with spring loaded stop balls 52 (see FIG. 4), which are caught in corresponding stop grooves 53 on guide rod 18 and 19.

From the described arrangement it is evident, that by a vertical movement of shift handle 41 a certain speed position will be chosen, since key 47 of shift rod 37 will engage the slot of one of the one-arm levers 35 or 36, whereas a horizontal movement of the shift handle 41 will effect shifting to forward or reverse in that speed, by way of shift rod 37, a turning of the one-arm lever connected to said shift rod by key 47, movement of the associated push rod, turning of the one-arm lever and the thereto connected double-lever, and by movement of the sliding gear wheels by said double-lever to forward or rearward drive position, depending on whether the shift handle is horizontally moved in one or the other direction.

The invention is, of course, not restricted to the described example; analogous modifications, for example, of the shift mechanism are quite possible.

Such a gear shift can also be provided with additional speed positions, since it would only be necessary e.g., to add another one-arm lever on the shift rod at its lower end and to connect the free end of the added one-arm lever to sliding gear wheels of another speed position the same way as described before. It is also easily possible to equip a transmission as described before with sliding type coupler sleeves or synchronizing units.

Figure 9:
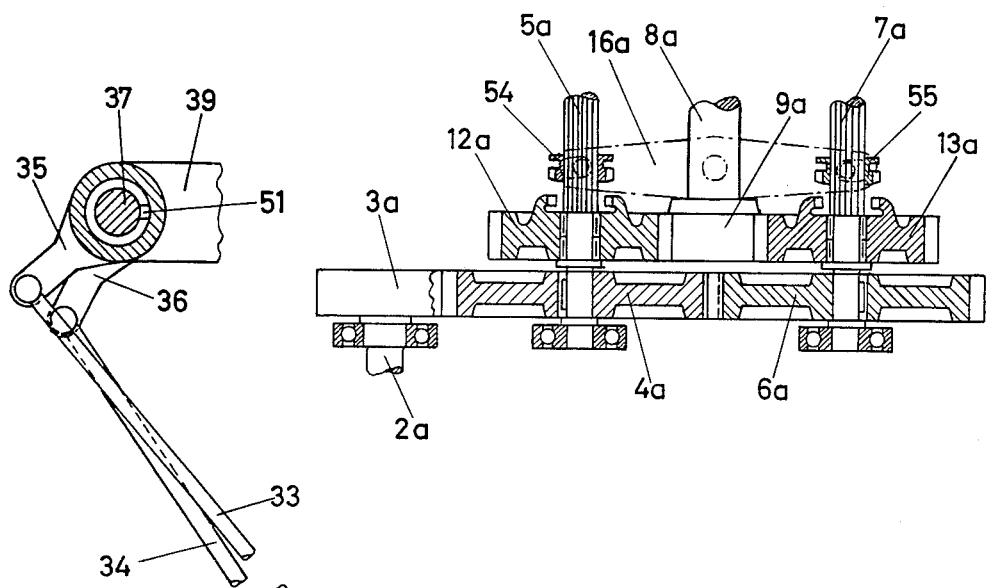
FIG. 9 is a schematic plan view similar to FIG. 3 showing part of a transmission with sliding type coupler sleeves.

In FIG. 9 e.g., a transmission is shown that is equipped with sliding type coupler sleeves in accordance with this invention.

The intermediate shafts 5a and 7a are driven by the drive shaft 2a, by way of gear wheels 3a, 4a, and 6a, to rotate at the same speed but in opposed directions.

A gear wheel 9a for a certain speed position is rigidly secured and keyed to the driven shaft 8a.

Gear wheel 12a, which is in constant engagement with gear wheel 9a of driven shaft 8a, is rotatably mounted on intermediate shaft 5a. Gear wheel 13a on intermediate shaft 7a is also engaged with gear wheel 9a. On one side, the gear wheels 12a and 13a are provided with internal gearings, which will engage external gearings on associated sliding type coupler sleeves 54 and 55, when said coupder sleeves are moved on their splined intermediate shafts. The sliding type coupler sleeves 54, 55 are connected to the shifting double-lever 16a by way of shift forks in the same manner as the gear wheels 12 and 13 are connected in FIGS. 2–8.

It will be recognized that the shifting mechanism between shifting double-lever 16a and shift handle can be arranged as shown in FIGS. 2–8, in order to obtain the same shifting results. It is, of course, possible to effect full synchronization by using synchronizing units instead of the sliding type coupler sleeves 54 and 55.

We now claim:

1. In a transmission of the class described, a driving shaft, a driven shaft, a pair of intermediate forward and rearward shafts each driven by said driving shaft, a first speed gear and a second speed gear mounted in spaced relation to each other on said driven shaft, a pair of gears keyed one to each of said intermediate forward and rearward shafts and shiftable in a particular axial direction into meshing relation to the first speed gear on the driven shaft, a further pair of gears keyed one to each intermediate shaft and shiftable in the aforesaid particular axial direction for meshing with the second speed gear on the driven shaft, and separate shifting means connected to each of such pairs of gears for selectively shifting the gears of that pair in opposed directions relatively to one another on their shafts, so that the shifting means by moving in one direction may mesh gears to effect driving in the same forward or rearward direction in each first and second speed.

2. A transmission as set forth in claim 1, in which the shifting means for each pair of gears include a double-ended lever pivoted at a medial point and connected through its opposed ends to the gears of the particular pair, and a pair of actuating levers connected each to one double-ended lever.

3. In a transmission of the class described, a driving shaft, a driven shaft, a pair of intermediate forward and rearward shafts each driven by said driving shaft, a first speed gear and a second speed gear mounted in spaced relation to each other on said driven shaft, a pair of gears mounted one on each of said intermediate forward and rearward shafts for meshing with the first speed gear on the driven shaft, a further pair of gears mounted one on each intermediate shaft for meshing with the second speed gear on the driven shaft, a shiftable part controlling each gear of said pairs of gears and each effective when shifted in the same direction to place its gear in driving relation between the corresponding intermediate shaft and speed gear, and separate shifting means for selectively shifting the two shiftable parts for each pair of gears in opposed directions relatively to each other, so that the shifting means by moving in one direction may effect driving in the same forward or rearward direction in each first and second speed.

References Cited by the Examiner
UNITED STATES PATENTS

| | | | |
|---|---|---|---|
| 2,101,774 | 12/37 | Brasfield | 74—355 |
| 2,773,339 | 12/56 | Stocks, et al. | 74—484 |
| 3,049,023 | 8/62 | McCordic | 74—484 |

DON A. WAITE, *Primary Examiner.*